United States Patent [19]

Sutrina et al.

[11] Patent Number: 4,600,848
[45] Date of Patent: Jul. 15, 1986

[54] COOLING OF DYNAMOELECTRIC MACHINES

[75] Inventors: Thomas A. Sutrina; Timothy J. Bland, both of Rockford, Ill.

[73] Assignee: Sundstrand Corporation, Rockford, Ill.

[21] Appl. No.: 738,053

[22] Filed: May 24, 1985

[51] Int. Cl.⁴ .............................................. H02K 9/19
[52] U.S. Cl. ...................................... 310/54; 310/211
[58] Field of Search .................... 165/89, 90; 384/316, 384/393; 310/52, 54, 58, 60 A, 85, 86, 90, 168, 172, 211, 261, 270

[56] References Cited

U.S. PATENT DOCUMENTS

| | | |
|---|---|---|
| 2,618,756 | 11/1952 | Fechheimer .......................... 310/65 |
| 3,149,478 | 9/1964 | Anderson et al. ..................... 310/54 |
| 3,235,756 | 2/1966 | Anderson . | |
| 3,479,541 | 11/1969 | Robinson . | |
| 3,564,315 | 2/1971 | Barton .................................. 310/54 |
| 3,648,085 | 3/1972 | Fujii ..................................... 310/54 |
| 3,689,786 | 9/1972 | Hunt . | |
| 4,119,872 | 10/1978 | Hunt . | |
| 4,396,848 | 8/1983 | Scheldorf et al. . | |
| 4,445,056 | 4/1984 | Gaylord ............................... 310/86 |

Primary Examiner—Patrick R. Salce
Assistant Examiner—D. L. Rebsch
Attorney, Agent, or Firm—Wood, Dalton, Phillips, Mason & Rowe

[57] ABSTRACT

Windage losses in the air gap of a dynamoelectric machine and normally associated with direct contact liquid cooling are avoided through the provision of a first weir (flange) radially inwardly of rotor conductors and a second weir radially and axially outwardly of the first weir which provides a fan-like spray of coolant on stator end turns at a location remote from the air gap.

8 Claims, 1 Drawing Figure

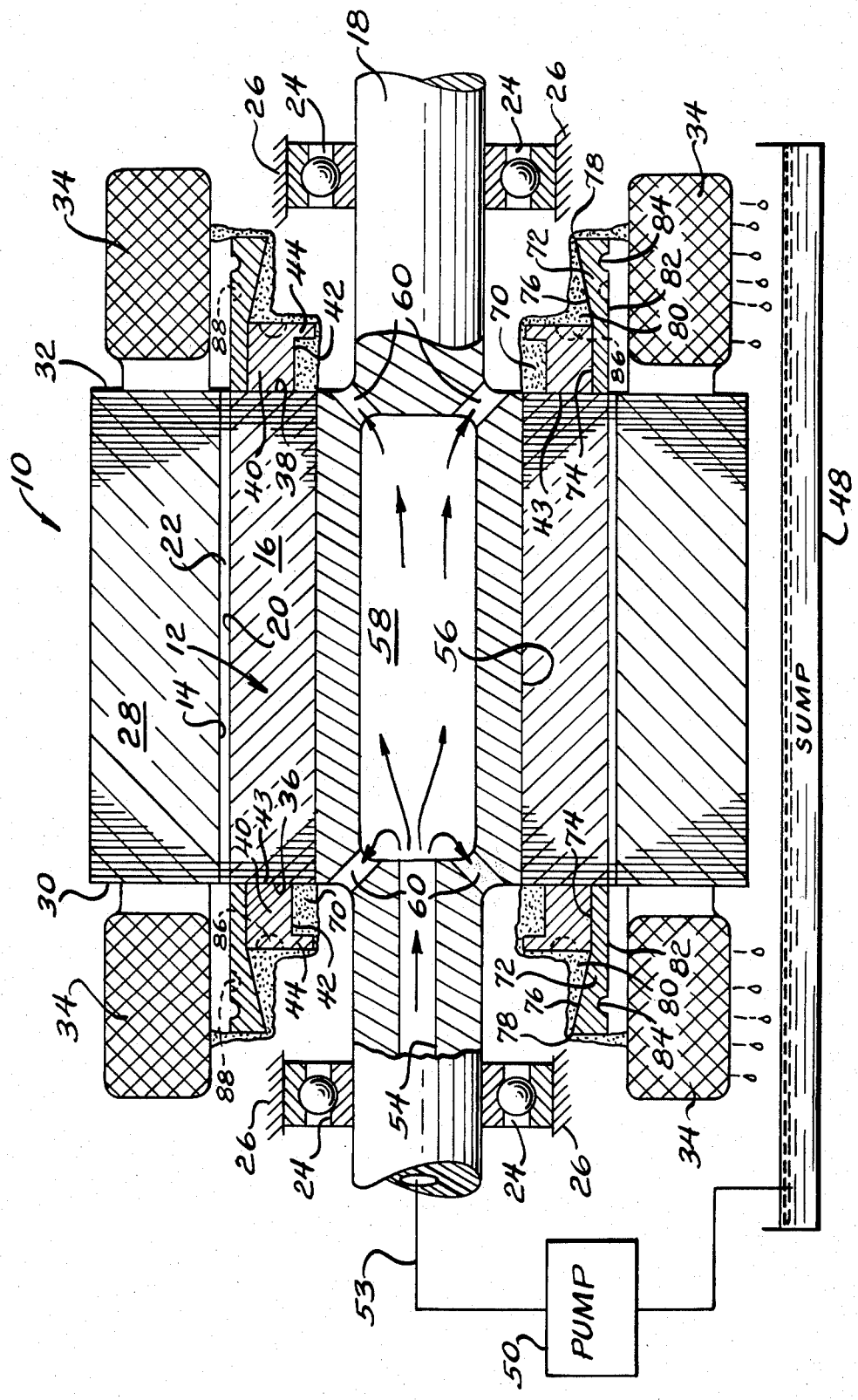

COOLING OF DYNAMOELECTRIC MACHINES

FIELD OF THE INVENTION

This invention relates to dynamoelectric machines, and more specifically to a means of cooling dynamoelectric machines without creating undesirable windage losses by the introduction of coolant into the air gap of such machines.

BACKGROUND OF THE INVENTION

Prior art of possible relevance includes the following U.S. Pat. Nos. 3,689,786 issued Sept. 5, 1972 and 4,119,872 issued Oct. 10, 1978, both to Hunt.

As is well known, the capacity of a dynamoelectric machine can be increased substantially if heat generated during its operation can be rejected from the machine itself. Consequently, most dynamoelectric machines today include some provision for flowing a fluid coolant across some part of the machine structure. Care must be taken, however, to prevent the coolant from causing undesirable windage losses. Windage is the energy loss due to shear forces acting within fluids disposed between relatively moving parts of the machine as, for example, in the so-called air gap between the rotor and the stator. Windage losses are affected by a variety of factors including the relative speed between two relatively moving components, the distance and area over which shear takes place, and the geometrical configuration of various components. The air gap between the stator and the rotor is the most significant concern as a source of windage losses and losses of an extremely high magnitude have been observed for high speed machines when a liquid coolant migrates to the air gap.

As a consequence, there have been a number of proposals for preventing coolant from entering the air gap including some wherein the coolant is always housed within conduits, which may even comprise the conductors themselves, in the rotor and stator and which form part of a coolant flow path which is completely isolated from the air gap. While systems of this sort work well in preventing undue windage losses, they are extremely expensive and accordingly are not cost effective for all applications.

As a cost effective means for providing cooling of a dynamoelectric machine, direct contact cooling with a liquid coolant is preferred. The above identified Hunt patents show the use of weirs in connection with direct contact cooling, principally of rotor components. However, care must be taken to keep deflected and splashed liquid away from and out of the air gap, or else undesirably high windage losses may come into existence, and the Hunt patents fail to deal with this problem.

Thus, the invention is directed to providing a low cost, cost efficient, direct contact cooling structure for use in dynamoelectric machines, which is such as to be highly efficient in preventing entry of liquid coolant into the air gap between the rotor and the stator of such machines, to thereby minimize windage losses.

SUMMARY OF THE INVENTION

It is a principal object of the invention to provide a new and improved dynamoelectric machine. More specifically, it is an object of the invention to provide an improved direct liquid contact coolant structure for use in dynamoelectric machines which avoids significant windage losses.

An exemplary embodiment of the invention achieves the foregoing objects in a dynamoelectric machine including a stator having an armature with opposed ends. Winding end turns extend therefrom and a rotor is journalled within the stator and is separated therefrom by an annular air gap. The rotor includes a body of magnetizable material having opposed end faces nominally axially aligned with the armature end and end conductors extend axially from each of the faces. Means are provided for introducing a liquid coolant into the rotor. The invention contemplates the provision of means defining a first annular weir on the rotor in heat exchange relation with at least one of the end conductors and located radially inwardly of the end conductor in axial alignment therewith. The first weir is in fluid communication with the coolant introducing means. There is further provided a means defining a second annular weir on the rotor which is located radially outwardly of the one end conductor and axially outwardly of the first weir so as to receive coolant overflowing the first weir. The second weir has an annular lip axially aligned with the winding end turn at the adjacent armature end so that coolant overflowing the lip of the second weir will be sprayed on the winding end turn.

As a consequence of the foregoing construction, the rotor end conductors are cooled by coolant received in the first weir and the stator end turns are cooled by coolant overflowing the second weir. The structure is such as to prevent the coolant from entering the air gap.

In a highly preferred embodiment, the second annular weir is defined by a ring and the ring has a radially outwardly opening annular groove facing the air gap and located just axially inwardly of the lip. The groove acts to prevent Coanda forces from causing the liquid coolant to flow towards the air gap.

In a preferred embodiment, the rotor is a squirrel cage rotor and the end conductors on the rotor comprise electrically conductive rings. In a highly preferred embodiment, the first weir is formed on the radially inner surface of the electrically conductive rings.

According to this embodiment, the first weir is defined by a radially inwardly opening groove formed on the radially inner surface of the radially conductive ring.

Where both weirs are formed of rings, it is preferred that the second weir ring be shrink fitted on the outer diameter of the electrically condutive ring. The ring defining the second weir preferably has at least two different internal diameters, the lesser internal diameter defining the lip. In a highly preferred embodiment, the second weir ring has a first internal diameter section which is fitted about the electrically conductive ring and a second frusto-conical internal diameter section tapering from the first section to the annular lip.

Other objects and advantages will become apparent from the following specification taken in connection with the accompanying drawings.

DESCRIPTION OF THE DRAWINGS

The FIGURE is a view, partially in section and partially schematic, of a dynamoelectric machine made according to the invention.

DESCRIPTION OF THE PREFERRED EMBODIMENT

An exemplary embodiment of a dynamoelectric machine made according to the invention is illustrated in the FIGURE and is seen to include a stator, generally designated 10 with a rotor, generally designated 12, journalled for rotation within a cylindrical opening 14 in the stator 10.

The rotor 12 includes a body 16 of magnetizable material mounted on a shaft 18. The radially outer surface 20 of the body 16 is cylindrical and is spaced from the opening 14 in the stator 10 by an air gap 22.

Bearings 24, suitably mounted in a housing shown schematically at 26, journal the shaft 18.

Returning to the stator 10, the same includes an armature 28 of any conventional construction which is a body of magnetizable material. The armature 28 includes opposite ends 30 and 32, from which the end turns 34 of conventional stator windings axially extend. It will be observed that the ends 30 and 32 of the armature 28 are nominally axially aligned with end faces 36 and 38 of the body of magnetizable material 16 forming part of the rotor 12 as is conventional.

In a preferred embodiment, the rotor 12 is a squirrel cage rotor and, to this end, it is provided with end rings 40 on each of the end faces 36 and 38 which are formed of electrically conductive material and conventionally form part of the rotor winding.

According to the invention, the end rings 40 extend axially from their respective faces 36 and 38 and include radially inwardly opening grooves 42. In some instances, a sealant may be disposed at the interfaces 43 of the end faces 36 and 38 and the rings 40. A radially inwardly directed lip 44 is located on the axially outer part of each of the rings 40 and with the groove 42 defines a first weir structure, as will be seen.

As is conventional, the housing 26 will include a sump 48. A combination coolant and lubricant, usually oil, is circulated through the machine by means of a pump 50 connected to the sump 48. By means not shown, the bearings 24 will be provided with the liquid coolant and lubricant for lubricating purposes. By means of suitable fittings shown schematically at 52, the liquid, this time used for cooling purposes, is provided to a bore 54 in one end of the shaft 18.

Intermediate its ends, the shaft 18 includes an enlarged diameter portion 56 on which the body of magnetizable material 16 is mounted. Within the enlarged diameter portion 56 is a coolant gallery 58.

A series of radially outwardly and axially outwardly directed bores 60 extend from the gallery 58 to the junction of the enlarged diameter portion 58 and the main body of the shaft 18 as illustrated, to open radially inwardly of the groove 42 on the associated electrically conductive ring 40.

Thus, according to the invention, oil entering the gallery 58 will provide cooling for the rotor 12 by absorbing, through conduction, heat generated in the windings within the body 16 and conducted therethrough and through the wall of the shaft adjacent the gallery 58.

Additionally, coolant flowing through the passages 60 accumulates in the grooves 42 and is held there by centrifugal force during operation of the machine as an annular pool 70 about the end faces 36 and 38 of the rotor 12. The coolant pool 70 is, of course, in direct contact with the electrically conductive rings 40 and thus serves to absorb heat generated in such rings 40 during operation of the machine.

To provide for direct contact cooling of the end turns 34, a second ring 72 is located at each end face 36 and 38 of the rotor 12 for rotation therewith. Each ring 72 includes a first internal diameter section 74 which is approximately the same diameter as the outer diameter of the rings 40 and has the same axial length. In a preferred embodiment, the diameter of the first internal diameter section 74 is slightly less than the outer diameter of the rings 40 so as to allow the rings 72 to be fitted to the rotor 12 by shrink fitting upon the rings 40.

Adjacent the first internal diameter section 74, the interior of each of the rings 72 includes a second section 76 which is frusto-conical and tapers radially inwardly from the first internal diameter section 74 to terminate in a lip 78 which is axially outwardly and spaced from the axially outer portion of the corresponding ring 40.

As a consequence, the lip 78 defines a second weir with coolant overflowing the lip 44 on the rings 40 forming an annular pool 80 on the second internal diameter section 76.

While the rings 72 may be formed of any suitable material, in a preferred embodiment, they are made of highly thermally conductive material so that the coolant in the pools 80 may absorb heat via conduction through the rings 72 which are in good thermal contact with the radially outer surfaces of the corresponding rings 40.

Coolant overflowing the lip 78 will be thrown by centrifugal force as a 360° fan shaped spray against the end turns 34 for cooling purposes. The coolant, upon impinging on the end turns 34 will tend to adhere thereto, to flow about the same under the influence of gravity, to ultimately collect in the sump 48 for recirculation.

In a highly preferred embodiment of the invention, just axially inwardly of the lips 78, the radially outer surface 82 of each of the rings 72 is provided with a radially outwardly opening groove 84 which, as will be seen from the FIGURE, generally faces the air gap 22. The grooves 84 tend to prevent Coanda effect forces from drawing any portion of the spray toward the air gap to create windage losses.

In a number of instances, it will be desirable to selectively remove material from the rotor 12, generally for balancing purposes. This may be accomplished, for example by machining axially opening grooves 86, shown in dotted lines, in the axially outer surfaces of the rings 40. Alternatively, or collectively, it may be accomplished by machining one or more grooves 88, also shown in dotted lines, in the radially outer surfaces of the rings 72 at locations axially inwardly of the grooves 84.

From the foregoing, it will be appreciated that direct contact liquid coolant structure for dynamoelectric machines made according to the invention provides substantial advantages over those heretofore known. Where the rotor 12 is a squirrel cage rotor, the first weir can be formed within the end rings which must be present in any event, necessitating only the addition of the rings 72 to provide an economical construction. The use of the axially longer rings 72 as a second weir provides for delivery of the coolant to the stator end turns 34 at a distance quite remote from the air gap between the armature 28 and the rotor 12, thereby minimizing the possibility of liquid entering such gap to create windage losses; and the provision of the grooves 84 further minimizes such possibility. Thus, a highly efficient dynamoelectric machine is provided according to the invention.

We claim:

1. In a dynamoelectric machine, the combination of
   a stator including an armature having opposed ends with winding end turns extending therefrom;
   a rotor journalled within said stator and separated therefrom by an annular air gap, said rotor including a body of magnetizable material having opposed end faces nominally axially aligned with said armature ends and end conductors extending axially from each of said faces;
   means for introducing a liquid coolant into said rotor;
   means defining a first annular weir on said rotor in heat transfer relation with at least one of said end conductors and located radially inwardly thereof in axial alignment therewith and in fluid communication with said introducing means; and
   means defining a second annular weir on said rotor and located radially outwardly of said one end conductor and axially outwardly of said first weir, said second weir having an annular lip axially aligned with the winding end turn at the adjacent armature end so that coolant overflowing the lip of said second weir will be sprayed on such winding end turn.

2. The dynamoelectric machine of claim 1 wherein said second weir is defined by a ring having at least two different internal diameters, the lesser internal diameter defining said lip, and a radially outwardly opening groove in the outer peripheral surface of said ring in proximity to said lip.

3. The dynamoelectric machine of claim 2 wherein said rotor is a squirrel-cage rotor and said one end conductor is an electrically conductive ring; said first weir being formed by a radially inwardly opening groove formed on the radially inner surface of said electrically conductive ring.

4. The dynamoelectric machine of claim 3 wherein said second weir ring is shrink fitted on the outer diameter of said electrically conductive ring.

5. The dynamoelectric machine of claim 3 wherein said second weir ring has a first internal diameter section fitted about said electrically conductive ring and a second frusto-conical internal diameter section tapering from said first section to said annular lip.

6. In a dynamoelectric machine, the combination of
   a stator including an armature having opposed ends with winding end turns extending therefrom;
   a squirrel cage rotor journalled within said stator and separated therefrom by an annular air gap, said rotor including a body of magnetizable material having opposed end faces nominally axially aligned with said armature ends and electrically conductive rings extending axially from each of said faces;
   means for introducing a liquid coolant into said rotor;
   means defining a first annular weir in the radially inner surface of at least one of said conductive rings and in fluid communication with said introducing means; and
   means, including a ring, defining a second annular weir on said rotor and located radially outwardly of said one conductive ring and axially outwardly of said first weir, said second weir having an annular lip axially aligned with the winding end turn at the adjacent armature end and axially outwardly of said one conductive ring so that coolant overflowing the lip of said second weir will be sprayed on such winding end turn.

7. In a dynamoelectric machine, the combination of
   a stator including an armature having opposed ends with winding end turns extending therefrom;
   a rotor journalled within said stator and separated therefrom by an annular air gap, said rotor including a body of magnetizable material having opposed end faces nominally axially aligned with said armature ends and end conductors extending axially from each of said faces;
   means for introducing a liquid coolant into said rotor;
   means defining a first annular weir on said rotor in heat transfer relation with at least one of said end conductors and located radially inwardly thereof in axial alignment therewith and in fluid communication with said introducing means; and
   means, including a ring, defining a second annular weir on said rotor and located radially outwardly of said one end conductor and axially outwardly of said first weir, said second weir having an annular lip axially aligned with the winding end turn at the adjacent armature end so that coolant overflowing the lip of said second weir will be sprayed on such winding end turn, said ring having a radially outwardly opening annular groove facing said air gap and axially inwardly of said lip.

8. The dynamoelectric machine of claim 7 wherein said ring is made of thermally conductive material and is in heat transfer relation with said one end conductor.

* * * * *